Patented Apr. 8, 1947

2,418,797

UNITED STATES PATENT OFFICE 2,418,797

CONTINUOUS PROCESS FOR POLYMERIZING OLEFINS

Vanderveer Voorhees, Hammond, Ind., assignor to Standard Oil Company, Chicago, Ill., a corporation of Indiana Application April 1, 1939, Serial No. 265,453

7 Claims. (Cl. 260—94)

This invention relates to the polymerization of liquids and particularly to the polymerization of unsaturated hydrocarbons such as isoprene, butadiene, isobutylene, etc., into heavy hydrocarbons, lubricating oils, synthetic rubber and plastics. The invention relates more particularly to the polymerization of unsaturated organic liquids wherein a rapid rate of polymerization is obtained by the action of the catalyst and the polymerization is substantially complete within a relatively few seconds or minutes. One object of the invention is to provide a method of carrying out the polymerization of unsaturated organic liquids continuously and under closely controlled temperature conditions. Another object of the invention is to provide a method and apparatus for conducting polymerization reactions in a thin film of controlled thickness in contact with a circumambient vaporous catalyst. Still another object of the invention is to provide a method of conducting catalytic polymerization reactions wherein the polymerizing liquid is caused to flow countercurrently to the flow of the catalyst. Another object of the invention is to provide a method and apparatus for conducting polymerization reactions at extremely low temperatures whereby the heat of reaction may be rapidly removed from the reacting material, thus substantially avoiding any rise in temperature more than a very few degrees, for example, 5° C. The problem of controlling the temperature of polymerization reactions is particularly difficult where the reaction product is a plastic or viscous semi-solid.

Figure 1:
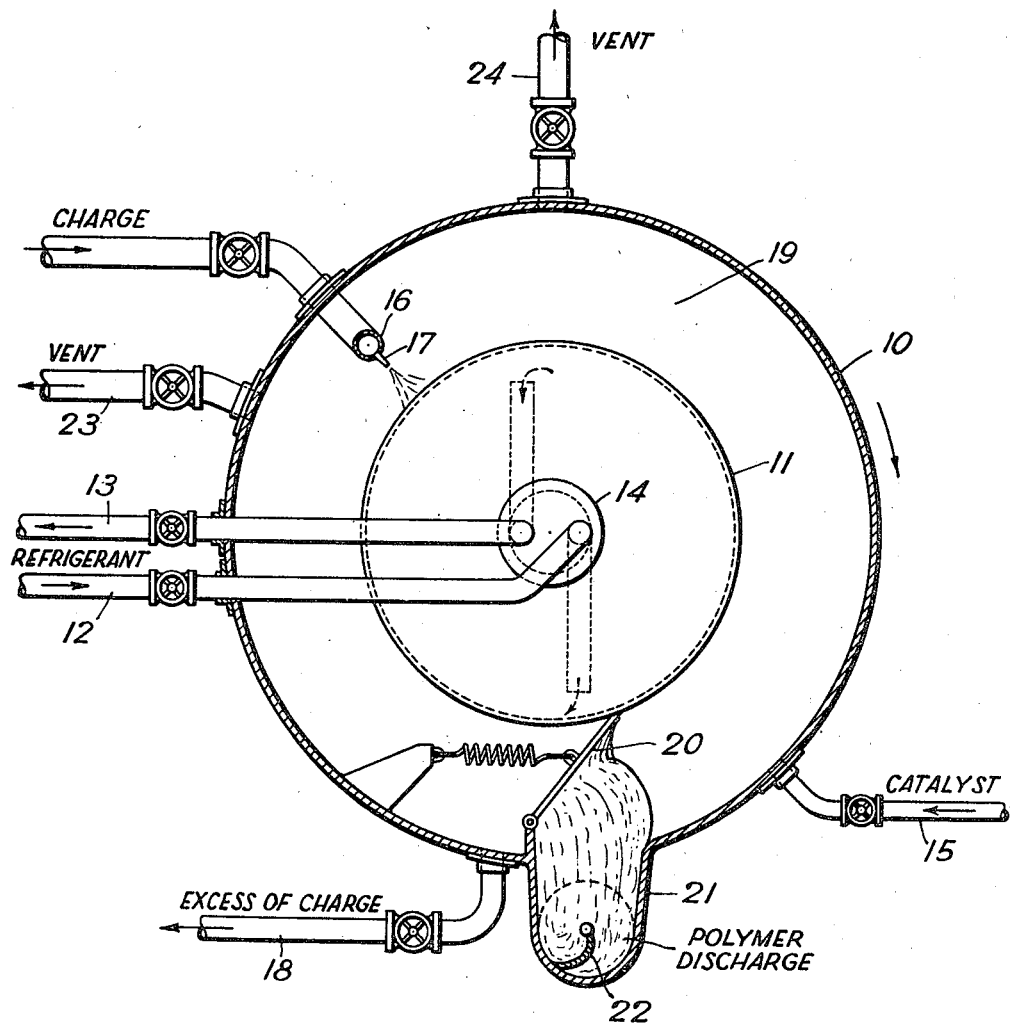
Figure 2:
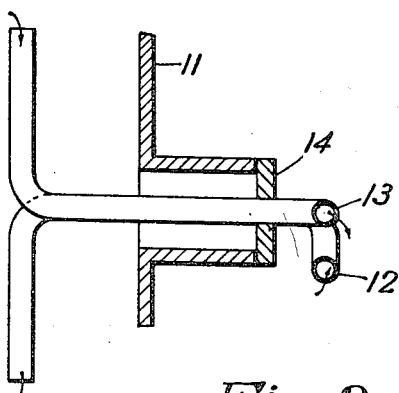

The invention is described with the aid of the accompanying drawing in which Figure 1 shows diagrammatically a cross section of an apparatus employed in carrying it out, and Figure 2 is a detail of a section of the apparatus shown in Figure 1.

Referring to Figure 1, cylindrical casing 10 encloses drum 11 which may be mounted concentrically with suitable journals and stuffing boxes enabling it to be rotated in the direction of the arrow. Drum 11, which is cylindrical in form, is supplied with a temperature regulating fluid introduced thereinto and withdrawn therefrom by lines 12 and 13 respectively. Cover plate 14 closes one end by means of a ground joint or packing gland. In Figure 2 the cover plate 14 is shown in section closing one end of the shaft of rotating drum 11. Stationary refrigerant lines 12 and 13 are shown passing through the cover plate 14 and the hollow shaft of drum 11.

If desired, the surface of drum 11 may be internally divided into segments with separate connections from each segment to a rotating valve in a manner commonly employed in vacuum filter construction. By this means, the temperature may be varied over different areas of the surface as desired by circulating fluids of different temperatures through different segments, or a single fluid may be caused to flow through all the segments in series, beginning and ending at a fixed point in the cycle of rotation concurrently or counter-currently to the direction of rotation. In general, however, this added complication is not necessary.

A typical polymerization operation may be carried out as follows: A suitable refrigerant fluid, for example, liquid ammonia, liquid propane, or liquid ethylene is introduced into drum 11 so that the temperature is regulated at the point desired, for example —102° C. The drum is set in rotation at the desired rate, for example, one to ten revolutions per minute or even slower, e. g., one revolution in 5 minutes, and the space within chamber 10 is filled with the catalyst vapor which may be admitted by line 15. The catalyst may be $BF_3$, $BCl_3$ or other vaporous active metal halogen compound, HCl, HF, HBr, etc. Boron fluoride may be promoted by small amounts of HF, etc., which may be premixed with it or introduced separately into chamber 10. The amount of catalyst required may be about 0.1% to about 2% of the unsaturated hydrocarbon polymerized. In some cases even less catalyst may be used, for example, 0.02 to 0.05%.

An unsaturated hydrocarbon, for example, liquid isobutylene, suitably precooled to the reaction temperature, is now introduced by distributor pipe 16. Pipe 16 parallels the surface of drum 11 and is equipped with small nozzles or orifices 17, directing streams or sprays of liquid isobutylene against the surface of drum 11 building thereon a film of the desired thickness. If desired, additional induction pipes, similar to 16, spaced apart in the direction of rotation, may be employed to augment further the film of hydrocarbon on the drum surface. Any excess of hydrocarbon accidentally or intentionally applied to the surface of the drum 11 will flow downward and be withdrawn by valved outlet 18.

As the film on the drum 11 is carried by the rotation of the drum into contact with the catalyst in vapor space 19, it rapidly polymerizes to high molecular weight products which may be heavy oils, plastic liquids, semi-solids, or solids. Where oils or plastics are produced by the reaction, they may be removed from the surface of the drum by scraper 20 which directs the product into trough 21 wherein impeller screw 22 removes them through an outlet line not shown. Heavy oils which are not too viscous may be withdrawn by a simple liquid outlet. Where the products are solids, sufficient dilution may be present in the unsaturated feed stock to maintain them in plastic condition and thus simplify their removal.

In the case of certain polymerization reactions, where the product is a tough elastic solid, it is frequently necessary to avoid the use of diluents in the reacting material. Thus, isobutylene in solution in other hydrocarbons, for example, butane, may be readily polymerized with $BF_3$ to hydrocarbons having molecular weights of 1000 to 25,000. Low temperatures, especially below $-10°$ C., encourage formation of higher molecular weight products, the lower the temperature the higher the molecular weight. In order to obtain products of still higher molecular weight, for example, 50,000 to 500,000, it is desirable to employ pure isobutylene. In this case, the product from the polymerization reaction is a tough, elastic, colorless, transparent substance somewhat resembling unvulcanized rubber. When making this product, it may be removed from the surface of drum 11 in the form of a web or sheet. For example, it may be dislodged from the polished surface of the drum by sharp edged scraper 20 and then conducted as a web over a roller submerged in trough 21 beneath a layer of sealing fluid, for example, mercury. The web may then be conducted continuously to an outside roller or spool not shown.

Pure isobutylene for the process may be prepared by dehydration of isobutyl alcohol by passing the vapors of the alcohol over a heated dehydrating catalyst such as aluminum oxide, thorium oxide, etc. I prefer, however, to avoid high temperatures which often produce a rearrangement of the carbon atoms in the unsaturated hydrocarbon and these may be avoided by dehydrating the isobutyl alcohol with anhydrous oxalic acid. It is only necessary to heat the isobutyl alcohol mildly with the anhydrous acid and collect the isobutylene gas which is evolved in very pure form. In this manner contamination of the isobutylene by other olefins may be prevented.

In order to increase the concentration of the $BF_3$ catalyst and thereby hasten the polymerization and increase the molecular weight of the product, I may supply the catalyst gas under pressure. For example, I may conveniently employ pressures from 1 to 10 atmospheres in space 19. If pure $BF_3$ is not available, the space 19 may become surcharged with inert gas, for example, nitrogen, air, etc. In this case the inert gas, if present in sufficient concentration to undesirably depress the rate of polymerization, may be withdrawn by vent lines 23 and/or 24. In general, I prefer to employ some inert gas such as nitrogen within the apparatus and operate under sufficient pressure to obtain the desired rate of catalyst absorption and polymerization. The presence of inert gas in the apparatus assists in providing counterflow between the catalyst and the polymerizing film, since in this case, the concentration of the catalyst vapor gradually diminishes as it passes toward the vent 23. By the use of pressure, I am also enabled to obtain more complete utilization of the catalyst, e. g., $BF_3$, no catalyst being lost from the process beyond that used up therein and carried out in solution in the reaction product.

Instead of applying the unsaturated liquid feed to the drum through a spray type distributor as shown, I may employ a trough for this purpose placed at the bottom of chamber 10 and arranged for the drum 11 to dip beneath the surface of the liquid feed therein. In this case, it is important to shield the liquid in the trough from the $BF_3$ vapor, which may be done by a blanket of an inert gas beneath suitable baffles.

As previously indicated, the polymerization of isobutylene and other unsaturated liquids in the form of a thin film in direct contact with a refrigerated heat conducting surface makes it possible to control the reaction in a manner heretofore utterly impossible. In ordinary polymerization of such materials, the heat of polymerization produces a rapid rise in temperature which in turn may speed up the reaction to almost explosive violence. Various means of controlling the reaction temperature have been attempted but usually they have only succeeded in controlling the average reaction conditions, while local temperatures within the reacting materials have been largely uncontrolled. Thus, in the polymerization of isobutylene within refrigerated vessels provided with agitation, local reaction temperatures might rise 25 or 50° C. while the average temperature remains within 10 or 20° of the desired point. The addition of refrigerating diluents, such as liquid ethylene, solid carbon dioxide, etc. have resulted in diluting the catalyst and interfering with the reaction generally. With my new method of film polymerization, I may obtain products of higher average molecular weight than heretofore have been possible. I may also conduct the polymerization at intermediate temperatures and obtain products of the same molecular weight, viscosity, etc., as heretofore obtained at much lower temperatures because of the improvement in temperature control and catalyst concentration control. Although my process may conveniently be conducted at room temperature, and in some cases at temperatures up to 50 or 100° C., I prefer to operate with isobutylene at lower temperatures, generally below $-10°$ C. Temperatures of $-40°$ C. can be readily obtained with liquid ammonia and temperatures of $-60$ to $-80°$ C. may be obtained with solid carbon dioxide. Lower temperatures, for example $-100$ to $-125°$ C. may be obtained with other suitable refrigerants.

Having now described my process and apparatus in considerable detail as applied to a particular adaptation thereof, I claim:

1. The process of catalytically polymerizing an unsaturated hydrocarbon liquid under controlled low temperature conditions which comprises continuously moving a film of said unsaturated hydrocarbon liquid on a moving surface within a catalytic polymerization zone, maintaining an atmosphere of a polymerization catalyst within said polymerization zone, simultaneously maintaining said film at said low temperature by indirectly refrigerating that part of the area of said film where said polymerization occurs, with sufficient refrigerating fluid to absorb the heat of polymerization, thereby preventing substantial increase in the temperature of said unsaturated hydrocarbons from the heat evolved by said polymerization reaction and producing a film of high molecular weight polymers and thereafter continuously removing said polymers from said polymerization zone.

2. The process of claim 1 wherein the unsaturated hydrocarbon liquid is isobutylene.

3. The process of claim 1 wherein the unsaturated liquid is isobutylene and the catalyst is $BF_3$.

4. In the process of catalytically polymerizing liquid isobutylene at a selected low temperature below about —10° C. wherein said isobutylene is contacted with $BF_3$ catalyst and thereby polymerized to high molecular weight hydrocarbon products, the improvement comprising moving a film of isobutylene on a moving surface within a catalytic polymerization zone, maintaining in contact with said film an atmosphere containing vapors of $BF_3$, simultaneously maintaining the polymerizing film at said selected low temperature by indirectly refrigerating the area of said film undergoing polymerization, thereby removing the heat of polymerization as rapidly as it is produced and controlling the catalytic polymerization of the isobutylene to produce a high molecular weight isobutylene polymer and thereafter removing said polymer product from said polymerization zone.

5. The process of claim 4 wherein the temperature is controlled so that the maximum temperature reached in the reaction is within 5° C. of the minimum temperature employed.

6. The process of claim 4 wherein the temperature employed is within the range of —40 to —125° C.

7. The process of claim 4 wherein the polymerizing isobutylene film is subjected to the action of said $BF_3$ catalyst under a pressure of about 1 to 10 atmospheres.

VANDERVEER VOORHEES.

REFERENCES CITED

The following references are of record in the file of this patent:

UNITED STATES PATENTS

| Number | Name | Date |
|---|---|---|
| 2,085,525 | De Simo et al. | June 29, 1937 |
| 2,085,524 | De Simo et al. | June 29, 1937 |
| 2,084,051 | Otto et al. | June 22, 1937 |
| 2,125,872 | Arveson | Aug. 9, 1938 |
| 1,431,676 | Miller | Oct. 10, 1922 |
| 1,942,764 | Miller | Jan. 9, 1934 |
| 2,028,776 | Hibbert | Jan. 28, 1936 |
| 2,144,548 | Safford | Jan. 17, 1939 |
| 2,142,980 | Huijser | Jan. 3, 1939 |

FOREIGN PATENTS

| Number | Country | Date |
|---|---|---|
| 318,580 | British | Apr. 5, 1930 |
| 491,739 | British | Sept. 8, 1939 |